United States Patent
Lee et al.

(10) Patent No.: US 10,679,183 B2
(45) Date of Patent: *Jun. 9, 2020

(54) METHOD AND SYSTEM FOR DISTRIBUTING AND TRACKING INFORMATION

(71) Applicant: JPMorgan Chase Bank, N.A., New York, NY (US)

(72) Inventors: Sih Lee, New York, NY (US); Adrian Kunzle, New York, NY (US)

(73) Assignee: JPMORGAN CHASE BANK, N.A., New York, NY (US)

(*) Notice: Subject to any disclaimer, the term of this patent is extended or adjusted under 35 U.S.C. 154(b) by 406 days.

This patent is subject to a terminal disclaimer.

(21) Appl. No.: 15/674,609

(22) Filed: Aug. 11, 2017

(65) Prior Publication Data

US 2017/0364864 A1 Dec. 21, 2017

Related U.S. Application Data

(63) Continuation of application No. 14/444,261, filed on Jul. 28, 2014, now Pat. No. 9,760,863, which is a (Continued)

(51) Int. Cl.
*G06Q 10/10* (2012.01)
*H04L 29/06* (2006.01)
*H04L 29/08* (2006.01)

(52) U.S. Cl.
CPC .......... *G06Q 10/10* (2013.01); *H04L 63/101* (2013.01); *H04L 63/0435* (2013.01); *H04L 67/26* (2013.01)

(58) Field of Classification Search
CPC ... G06Q 10/10; H04L 63/101; H04L 63/0435; H04L 67/26
See application file for complete search history.

(56) References Cited

U.S. PATENT DOCUMENTS

| 5,220,501 A | 6/1993 | Lawlor et al. |
| 5,892,909 A | 4/1999 | Grasso et al. ................ 709/201 |

(Continued)

FOREIGN PATENT DOCUMENTS

| CA | 2394503 A1 | 1/2003 |
| CN | 1284190 A | 2/2001 |

(Continued)

OTHER PUBLICATIONS

SAP SE, 'SAP Intelligent Notification 365, email API & service SAP On-boarding process for SAP S/4 HANA marketing cloud / SAP Hybris Marketing customers', .COPYRGT. 2016 SAP SE or an SAP Affiliate company, entire document, https://uacp2.hana.ondemand.com/doc/PRODUCTION/c753a49b1d51408c-9b577dedcc9e934e/1611%20YMKT/en-US/IntNot365mailAPIonbrdcust.pdf.

(Continued)

*Primary Examiner* — James R Turchen
(74) *Attorney, Agent, or Firm* — Greenblum & Bernstein, P.L.C.

(57) ABSTRACT

Aspects of the present invention are directed to a method and system for distributing information from an information distributor in a banking environment. The method may include composing an electronic notification instrument by providing a notification component and providing a payload component, the payload component including a selectable link. The method may additionally include pushing the electronic notification instrument to an information client and allowing a pull from the information distributor through the electronic notification instrument such that the payload component including the selectable link is activated by an authorized information recipient, the authorized information recipient determined by the information client. The method may additionally include determining through a tracer whether the electronic notification instrument has an accept- (Continued)

able disposition and rendering the electronic notification instrument inaccessible if the disposition is not acceptable.

20 Claims, 10 Drawing Sheets

Related U.S. Application Data continuation of application No. 11/873,015, filed on Oct. 16, 2007, now Pat. No. 8,819,815.

(56) References Cited

U.S. PATENT DOCUMENTS

| | | | |
|---|---|---|---|
| 5,958,005 A | 9/1999 | Thorne | |
| 6,014,688 A | 1/2000 | Venkatraman | |
| 6,029,146 A | 2/2000 | Hawkins et al. | 705/35 |
| 6,108,420 A | 8/2000 | Larose | |
| 6,178,442 B1 | 1/2001 | Yamazaki | |
| 6,192,407 B1 | 2/2001 | Smith et al. | 709/229 |
| 6,449,635 B1 | 9/2002 | Tilden, Jr. | |
| 6,529,956 B1 | 3/2003 | Smith et al. | 709/229 |
| 6,535,855 B1 | 3/2003 | Cahill et al. | |
| 6,567,854 B1 | 5/2003 | Olshansky et al. | 709/229 |
| 6,601,088 B1 | 7/2003 | Kelley | |
| 6,807,558 B1 | 10/2004 | Hassett et al. | 709/203 |
| 6,880,086 B2 | 4/2005 | Kidder et al. | 713/191 |
| 6,959,393 B2 | 10/2005 | Hollis et al. | |
| 7,058,685 B1 | 6/2006 | van Zee | |
| 7,076,244 B2 | 7/2006 | Lazaridis et al. | |
| 7,149,893 B1 | 12/2006 | Leonard | |
| 7,171,693 B2 * | 1/2007 | Tucker | G06F 21/14 |
| | | | 713/189 |
| 7,248,861 B2 | 7/2007 | Lazaridis et al. | |
| 7,376,652 B2 | 5/2008 | Hayes-Roth | |
| 7,610,045 B2 | 10/2009 | Little et al. | 455/418 |
| 7,613,726 B1 * | 11/2009 | Spivak | G06F 16/9535 |
| 7,673,059 B2 * | 3/2010 | Patterson | H04L 63/0428 |
| | | | 709/229 |
| 7,711,769 B2 | 5/2010 | Lazaridis et al. | |
| 7,721,104 B2 | 5/2010 | Salo et al. | |
| 7,738,900 B1 | 6/2010 | Manroa et al. | 455/519 |
| 7,747,782 B2 | 6/2010 | Hunt et al. | 709/246 |
| 7,836,132 B2 | 11/2010 | Qureshi | |
| 8,090,785 B2 | 1/2012 | Kirkpatrick | |
| 8,171,532 B2 | 5/2012 | Kakehi et al. | 726/6 |
| 8,200,761 B1 * | 6/2012 | Tevanian | H04L 51/12 |
| | | | 709/206 |
| 8,266,437 B2 * | 9/2012 | Sethi | G06Q 20/06 |
| | | | 283/17 |
| 8,296,351 B2 | 10/2012 | Lazaridis et al. | |
| 8,407,305 B2 | 3/2013 | Lazaridis et al. | |
| 8,407,776 B2 | 3/2013 | Somani et al. | |
| 8,533,118 B2 | 9/2013 | Weller et al. | 705/44 |
| 8,583,752 B2 * | 11/2013 | Buchhop | H04L 67/26 |
| | | | 709/207 |
| 8,688,583 B2 | 4/2014 | Boccon-Gibod et al. | 705/51 |
| 2001/0054115 A1 | 12/2001 | Ferguson et al. | 709/248 |
| 2002/0049841 A1 | 4/2002 | Johnson et al. | |
| 2002/0077978 A1 | 6/2002 | O'Leary et al. | 705/40 |
| 2002/0095454 A1 | 7/2002 | Reed et al. | 709/201 |
| 2002/0104018 A1 | 8/2002 | Singhani et al. | 713/201 |
| 2002/0143885 A1 | 10/2002 | Ross, Jr. | |
| 2002/0174195 A1 | 11/2002 | Meyer et al. | 709/219 |
| 2002/0194502 A1 | 12/2002 | Sheth et al. | 713/201 |
| 2003/0026231 A1 | 2/2003 | Lazaridis et al. | |
| 2003/0097410 A1 | 5/2003 | Atkins et al. | 709/206 |
| 2003/0101190 A1 | 5/2003 | Horvitz et al. | 707/100 |
| 2004/0034591 A1 | 2/2004 | Waelbroeck et al. | 705/37 |
| 2004/0049696 A1 | 3/2004 | Baker | |
| 2004/0068665 A1 | 4/2004 | Fox et al. | |
| 2004/0073634 A1 | 4/2004 | Haghpassand | |
| 2004/0083131 A1 * | 4/2004 | Kaufman | G06Q 30/02 |
| | | | 705/14.35 |
| 2004/0230476 A1 | 11/2004 | Messer | |
| 2005/0108124 A1 | 5/2005 | Colleran | |
| 2005/0138353 A1 | 6/2005 | Spies | |
| 2006/0005233 A1 | 1/2006 | Kleinsteiber et al. | 726/4 |
| 2006/0053194 A1 | 3/2006 | Schneider et al. | 709/204 |
| 2006/0085429 A1 | 4/2006 | Wener et al. | 707/10 |
| 2006/0156382 A1 | 7/2006 | Motoyama | |
| 2006/0229065 A1 | 10/2006 | Lazaridis et al. | |
| 2006/0236382 A1 | 10/2006 | Hinton et al. | 726/8 |
| 2007/0005713 A1 | 1/2007 | LeVasseur | |
| 2007/0038702 A1 | 2/2007 | Taylor | |
| 2007/0055731 A1 | 3/2007 | Thibeault | |
| 2007/0094332 A1 * | 4/2007 | Cama | G06Q 10/107 |
| | | | 709/206 |
| 2007/0180519 A1 | 8/2007 | Boccon-Gibod et al. | 726/21 |
| 2007/0239874 A1 | 10/2007 | Lazaridis et al. | |
| 2008/0059631 A1 | 3/2008 | Bergstrom et al. | 709/224 |
| 2008/0077809 A1 * | 3/2008 | Hayler | G06F 12/1466 |
| | | | 713/193 |
| 2008/0162206 A1 * | 7/2008 | Mak | G06Q 30/02 |
| | | | 705/14.53 |
| 2010/0174756 A1 | 7/2010 | Lazaridis et al. | |
| 2011/0161419 A1 | 6/2011 | Chunilal | 709/204 |
| 2013/0006774 A1 | 1/2013 | Lazaridis et al. | |

FOREIGN PATENT DOCUMENTS

| | | |
|---|---|---|
| DE | 6903328 T2 | 12/1989 |
| EP | 0504287 B1 | 7/1991 |
| EP | 1077437 | 2/2001 |
| EP | 1715649 | 10/2006 |
| WO | WO1991009370 | 6/1991 |
| WO | WO1999030295 | 6/1999 |
| WO | WO1999063709 | 12/1999 |
| WO | WO2002039275 | 5/2002 |
| WO | WO2002039666 A2 | 5/2002 |

OTHER PUBLICATIONS

Microsoft, 'Outlook settings for POP and IMAP access for Office 365 for business or Microsoft Exchange accounts', Microsoft, 2015, entire document, http://www.utpb.edu/docs/default-source/default-document-librar-y/office-365-outlook-settings-for-pop-and-imap.pdf?sfvrsn=0.

PostFinance, 'Set up a direct connection with PostFinance', PostFinance, 2013, entire document, https://www.postfinance.ch/binp/postfinance/public/dam.ibOXTuWsM-sMBToru6YsuGqWIYFNIhvmyddgD3bXbL8.spool/content/dam/pf/de/doc/prod/eserv/efin/efin_flletrans_biz_fs_en.pdf.

American Banker, "Push, Pull", Oct. 6, 1997.

Information Week, Dec. 15, 1997, "Explorer Gains Fame".

Information Week, Apr. 21, 1997, "Netscapre Adds Push Component—Communicator client to channel intranet news, software update to users".

Information Week, Mar. 2, 1998, "Battle in on to Prove Push's Value—Vendors integrate technology with key business apps".

Information Week, Dec. 15, 1997, "Lost in the Translation—IBM's MQSeries messaging middleware requires third-party help".

Information Week, May 19, 1997, "Browsers for E-Mail—Extended Web browsers from Netscape, microsoft and Apple deliver mail clients with corporate power".

Information Week, Oct. 27, 1997, "Documents Get a Push—Intranet-delivery technology upgraded".

Information Week, May 12, 1997, "Barnes & Noble Ventures Online—Exec says move will expand book market".

Information Week, May 15, 1997, "The Incredible Shrinking Bandwidth".

Matson et al. Ultrasonic flowmeters offer reliable solution to stack monitoring. (Air Polution Sensiung and Monitoring—Part 5a) (Tutorial).

Ilgen; "Expert system as an operator interface for advanced controls".

Apply Your Marketing Talent to Promote On-Line Banking, Bank Marketing, May 1, 1996.

Wired Magazine, Mar. 1997, "Push!"

(56) References Cited

OTHER PUBLICATIONS

Roving Software, Inc., Mar. 13, 1998 Turnkey Active Personalization for Web Commerce at http://www.roving.com/home.htm.
Meca Software LLC, Dec. 9, 1997 Press Release.
Press release, Nationsl Bank, Nov. 7, 1997.
Press Release, Nations Bank, Nov. 10, 1997.
Article from American Banker, Jan. 31, 1998.

* cited by examiner

METHOD AND SYSTEM FOR DISTRIBUTING AND TRACKING INFORMATION

RELATED APPLICATIONS

This application claims priority to and is a Continuation Application of U.S. patent application Ser. No. 14/444,362, filed on Jul. 28, 2014, which is a continuation of U.S. patent application Ser. No. 11/873,015, filed on Oct. 16, 2007, now U.S. Pat. No. 8,819,815.

TECHNICAL FIELD

Embodiments of the present invention relate to banking services and in particular to the dissemination of information in a banking communications system between an information distributor and information clients.

BACKGROUND OF THE INVENTION

In the banking industry, communication has evolved from the use of verbal and paper transactions such as mailings and facsimile transmittals to electronic transactions between participants. Electronic transactions generally improve the security of communications between parties. While both paper and electronically transmitted information can be misdirected, the electronically transmitted information can be sent with enhanced security measures such that only an intended recipient is able to access the information.

In response to the preference and appreciation for electronic transactions, various electronic technologies have been developed to disseminate banking information. One such technology is "Push Banking". A method and system for push banking are fully described in U.S. Pat. No. 6,535,855, which is hereby incorporated by reference.

Push banking systems attempt to address the problems clients encounter with traditional electronic transactions that often involve searching through enormous amounts of electronic information available on the Internet. In traditional systems or "pull" systems, clients operate a search engine or other technology to request information from a central system. In some instances, clients may install an automated pull system which periodically automatically searches available information electronically without client intervention. However, such automated systems may be inflexible and despite being automated, may require client maintenance and modification.

Thus, due to the problems for clients inherent in traditional pull banking systems, push banking systems have evolved. In a true push model, the central system sends information to the client, thus requiring considerably less client effort and generally requiring no customized client software. A true push banking system, such as that disclosed in U.S. Pat. No. 6,535,855 provides client data without client prompting and entirely at the client's convenience. While such a system provides superior service to the client, it also creates additional burdens for an information distributor. These burdens relate to the sending of large volumes of information and providing security to protect the information.

In many cases, the information distributor may be a large banking institution that has information clients such as traders, investment banking clients, and account holders. These information clients may also be sizable organizations that have a large number of employees or participants who are the ultimate information recipients. Only a select group of information recipients or in some instances only one information recipient may be permitted to view information pushed by the information distributor. Thus in many instances, the information distributor may have additional responsibility for properly directing, encrypting, or otherwise securing transmitted information.

Additionally, in the exchange of sensitive electronic information such as banking information, maintaining the security and integrity of distributed information can be critical. Current push systems are unable to trace the pushed information to determine whether the usage and location of the information is authorized. Furthermore, minimal security mechanisms have been provided for maintaining the security and integrity of pulled information.

In order to enable more secure and efficient transmission of sensitive information, a solution is needed that allows an information distributor to provide improved access to information without the burden of pushing all of the information to clients and ultimate recipients. A solution is further needed that directs entitled parties to available banking information in a secure and prompt manner. Additionally, a solution is needed for ensuring that information is used only for acceptable purposes and is accessed only by authorized parties.

BRIEF SUMMARY OF THE INVENTION

In one aspect of the invention, a method is provided for facilitating distribution of information from an information distributor in a banking environment. The method may include composing an electronic notification instrument by providing a notification component and providing a payload component. The payload component may include a selectable link. The method may include appending a tracer to the notification instrument. The method may additionally include pushing the electronic notification instrument to an information client and allowing a pull from the information distributor through the electronic notification instrument such that the payload component including the selectable link is activated by an authorized information recipient. The authorized information recipient may be determined by the information client.

In an additional aspect of the invention, a method is provided for distributing information and monitoring the distributed information in a banking environment. The method may include composing an electronic notification instrument by providing a notification component, a tracing mechanism, and a payload component. The payload component may include a selectable link. The method may additionally include pushing the electronic notification instrument to an information client and determining through the tracing mechanism whether the electronic notification instrument has an acceptable disposition. The method may further include rendering the electronic notification instrument inaccessible if the disposition is not acceptable.

In yet a further aspect of the invention, a system is provided for push and pull banking. The system may include a message composition engine for locating banking information for distribution and preparing a notification instrument. The message composition engine may include a notification module and a payload composition module. The system may further include a tracing engine for appending a tracer to the notification instrument. The system may further include a push component for pushing the notification instrument to an information client and a pull component for allowing pulling of information through the notification instrument by an authorized recipient of the information.

In another aspect of the invention, a system may be provided for distributing and monitoring banking information. The system may include a message composition engine for locating information for distribution and preparing a notification instrument. The message composition engine may include a notification module and a payload composition module. The system may additionally include a push component for pushing the notification instrument to an information client and a tracing engine for attaching a tracer to the notification instrument. The tracer may enable recording of a disposition of the notification instrument and further may enable spontaneous limitation of access to contents of the notification instrument. A tracer tracking mechanism may record identity information related to the recipient viewing the notification instrument.

BRIEF DESCRIPTION OF THE DRAWINGS

The present invention is described in detail below with reference to the attached drawings figures, wherein.

DETAILED DESCRIPTION OF PREFERRED EMBODIMENTS

Figure 1:
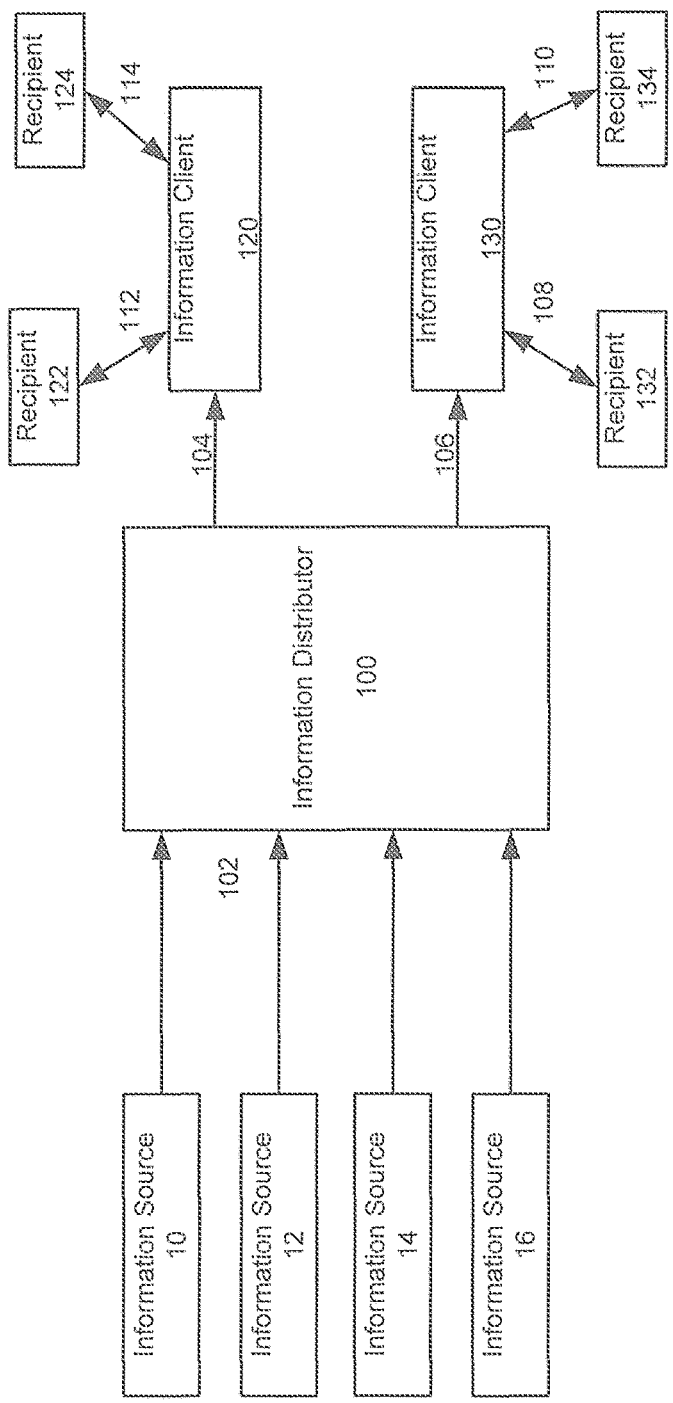
FIG. 1 is a block diagram illustrating a push and pull banking information system in accordance with an embodiment of the invention.

Embodiments of the present invention are directed to an apparatus and method for distributing information within a banking environment in a manner that benefits both distributors and recipients by implementing a push and pull banking system FIG. 1 is a block diagram illustrating a push and pull banking information system in accordance with an embodiment of the invention. Information sources 10, 12, 14, 16 send information 102 to an information distributor 100. The information 102 may include various types of banking documents including account information related to various types of accounts and confidential documents that may be related to mergers, acquisitions, divestitures, IPO notifications, etc. The information distributor 100 may push information 104, 106 to information clients 120 and 130. The push notification 104, 106 may include a handshake between the information distributor 100 and the information clients 120 and 130. The handshake allows decryption of an electronic notification.

The information clients 120 and 130 may in turn make the information available to information recipients 122, 124, 132, and 134. The information client 120 may provide access to the recipients 122 and 124 by allowing the information recipients 122 and 124 to pull at 112 and 114, the information pushed from the information distributor 100. Likewise, the information client 130 may allow recipients 132, 134 to pull at 108 and 110, information pushed to the information client 130 by the information distributor 100. In embodiments of the invention, the information clients 120, 130 may set entitlements so that only authorized recipients are able to pull the transmitted information.

Figure 2:
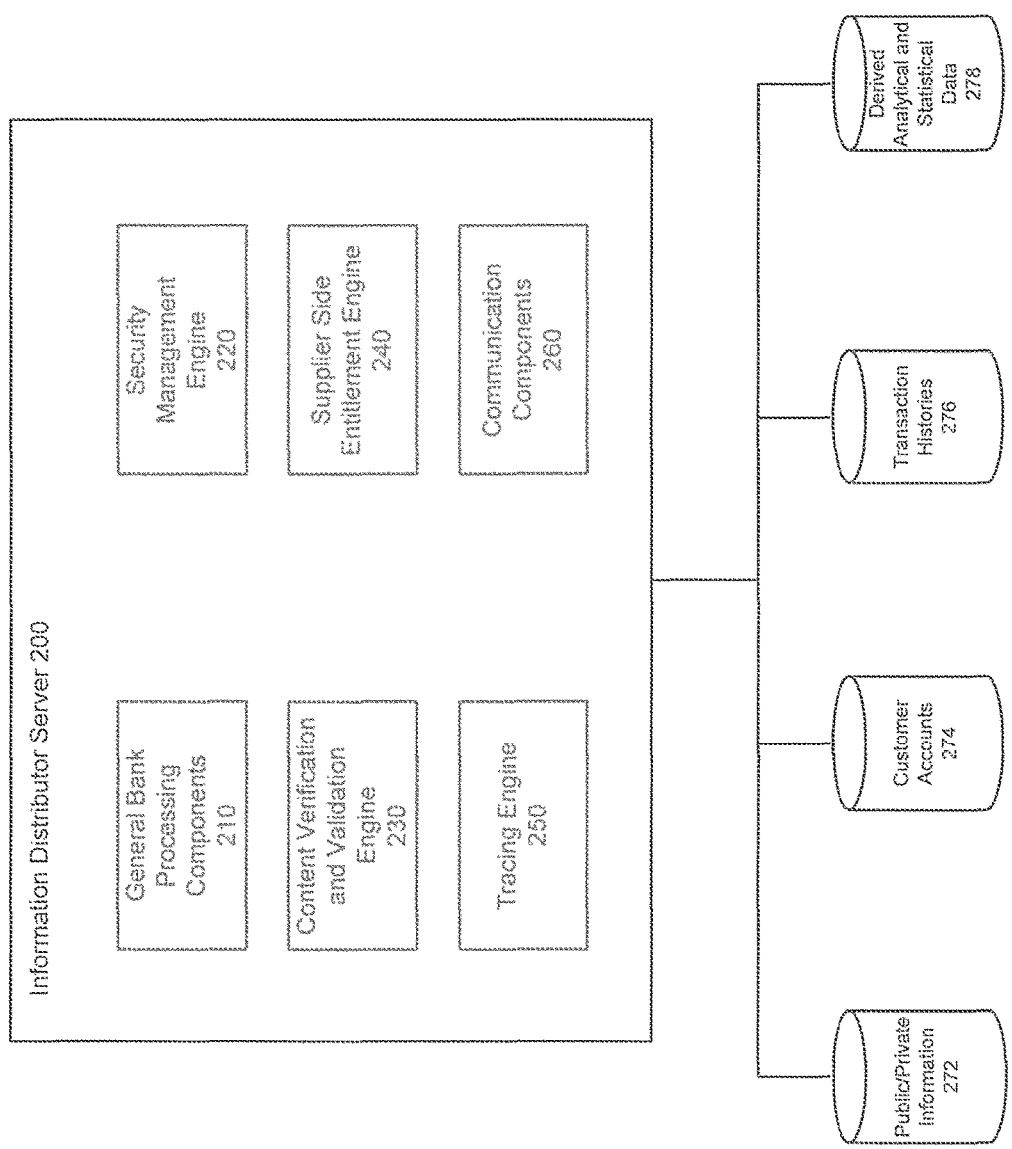
FIG. 2 is a block diagram illustrating an information distributor server in a push and pull banking system in accordance with an embodiment of the invention.

FIG. 2 is a block diagram illustrating an information distributor server 200 in a push and pull banking system in accordance with an embodiment of the invention. The information distributor 100 shown in FIG. 1 preferably includes a banking institution. The information distributor 100 may include a large infrastructure of personnel and computer systems, but preferably includes at least one information distributor server 200 as shown in FIG. 2.

The information distributor server 200 as shown in FIG. 2 may be or include a computer system. The information distributor server may be described in the general context of computer-executable instructions, such as program modules, being executed by a computer. Generally, program modules include routines, programs, objects, components, data structures, etc. that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The information distributor server 200 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with one another in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

The information distributor server 200 may include a plurality of software processing modules stored in a RAM or other memory as described above and executed on a processor in the manner described above. Embodiments of the information distributor server 200 may include general banking processing components 210, a security management engine 220, a content verification and validation engine 230, a supplier side entitlement engine 240, tracing components 250, and communication components 260. The information distributor server 200 may include or may be connected with a variety of databases. For exemplary purposes, a public/private information database 272, a customer account database 274, a transaction history database 276, and a derived analytical and statistical data database 278 may be included. Each of these components will be further described below.

The general bank processing components 210 serve the purpose of processing requests. The requests may relate to customer account information, transactional information, statistical data, and public and/or private information. The bank processing components 210 may process incoming transactions such as money deposits, drafts, orders to pay bills, money transfers, letters of credit, and other similar requests. Processed information may be output by the processing components 210 as outgoing transactions such as banking statements and notification of various events to banking customers. In operation, the general processing components may extract information from the databases 272, 274, 276, and 278 in order to process transactions and may further store processed information in these databases.

The security management engine 220 may address well known internet security challenges and additional security challenges of various types of communications. The security management component 220 may include mutual authentication capabilities through encryption or other techniques. Encryption may include identity-based encryption and/or key-based encryption such as pretty good privacy (PGP) encryption. The security management engine 220 may also perform key management and certificate management and active defense against hackers. Active defense techniques that may be implemented are fully described in U.S. Pat. No. 6,535,855. The security management engine 220 is able to determine appropriate security for transmitting a notification instrument to push client, who in this instance is the information client 120, 130. The type of encryption or security selected may be dependent upon a variety of factors including client identity and statement type.

The supplier side entitlement engine 240 allows the information distributor 100 to set the various entitlements for various internal information suppliers. The entitlements preferable include a series of processing rules which determine what types of reports and statements may be sent to which information clients for each of the information suppliers.

Figure 3:
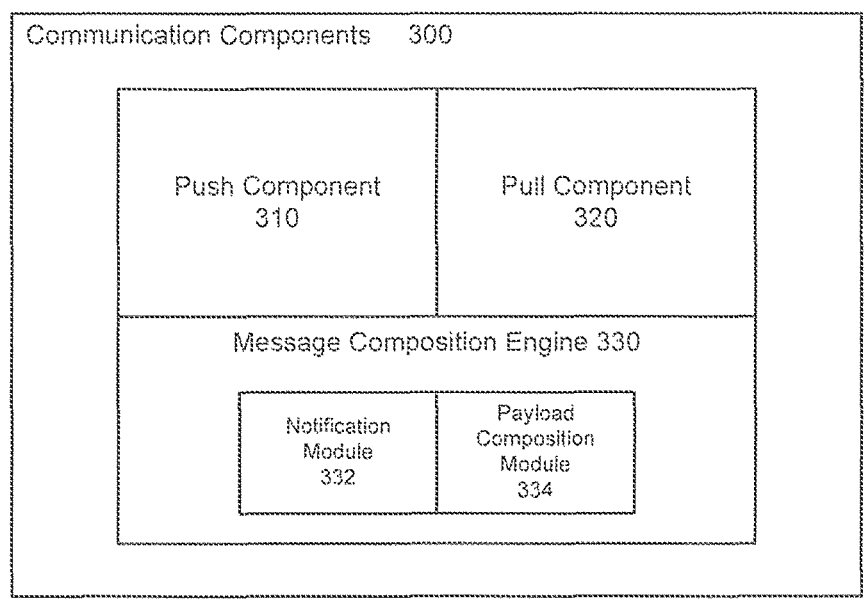
FIG. 3 is a block diagram illustrating communication components of the information distributor server in a push and pull banking system in accordance with an embodiment of the invention.

FIG. 3 is a block diagram illustrating communication components 300 (shown as 260 in FIG. 2.) in a push and pull banking system in accordance with an embodiment of the invention. The communication components 300 may include a push component 310, a pull component 320, and a message composition engine 330. The message composition engine 330 may include a notification module 332 and a payload composition module 334. The message composition module 330 composes a message or notification instrument, which in one preferred implementation of the invention is an electronic mail message. The notification module 332 may compose a notification section of the notification instrument. The notification section may provide notification that information is available without providing the actual information. The payload composition module may create a link to information stored with the information distributor or in another remote location. Upon receiving a notification that the information in the payload is available, an ultimate recipient may pull the available information from its stored location. All or parts of the notification instrument and its contents may be secured or appropriately encrypted as described above in order to ensure the security of the information.

Figure 4:
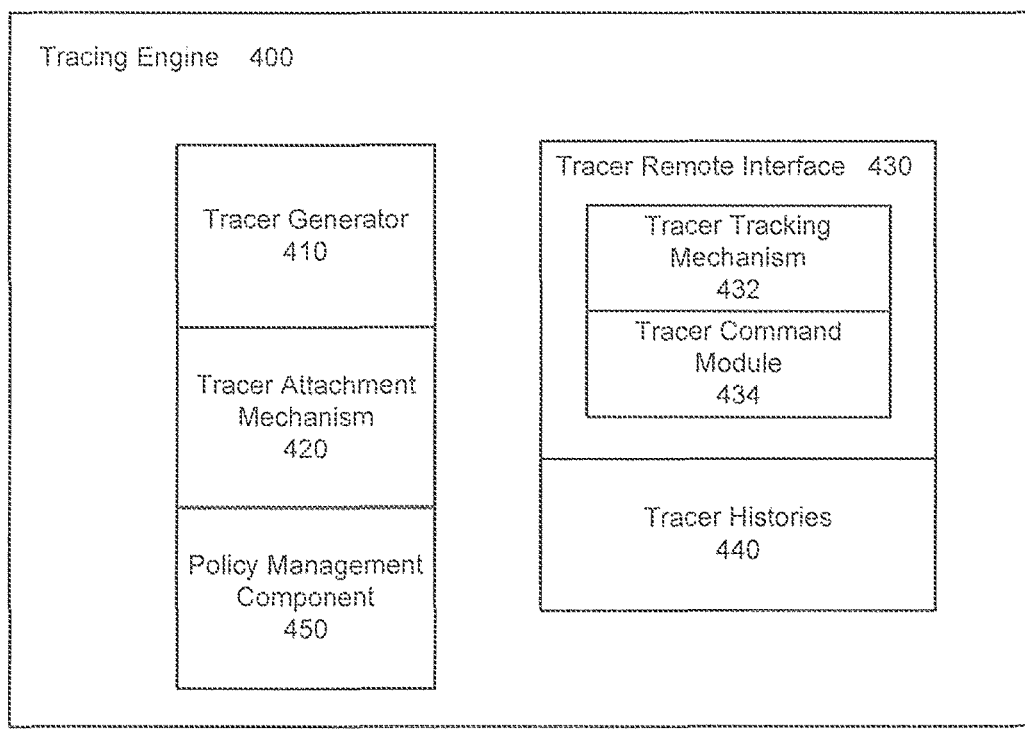
FIG. 4 is a block diagram illustrating a tracing engine of the information distributor server in accordance with an embodiment of the invention.

FIG. 4 is a block diagram illustrating a tracing engine 400 (shown is 250 in FIG. 2) in accordance with an embodiment of the invention. The tracing engine 400 may include a tracer generator 410 and a tracer attachment mechanism 420 for attaching the generated tracer. The tracer generator 410 may generate an object to be embedded in a notification instrument such as an email that allows monitoring of whether a user has viewed the email. When the notification instrument is opened, the embedded object may be downloaded through a request from the recipient's browser to the information distributor server or other remote server storing the object, thus allowing the server to record the download. Thus, the notification instrument is not wholly self-contained and refers to content on another server. When the ultimate recipient accesses the notification instrument, a request may automatically be sent to a server to send additional content. The request may include the IP address of the requesting computer, the time of access, and the type of web browser that made the request. For example, the tracer generator 410 may generate a GIF image such as a 1×1 pixel IMG tag. The tracer may be either visible or invisible to the recipient of a notification instrument containing the tracer. The tracer may be the type of device known as a web beacon, tracking bug, pixel tag, web bug, or clear GIF. Other types of tracers that do not require embedded images are also within the scope of the invention.

Regardless of the type of tracer installed, the tracer is appended to the notification instrument sent by the information distributor so that the information client will not be required to install or configure any software. Thus, the tracer can be self-sufficient in implementing policies and duties.

The tracing engine 400 may additionally include a policy management component 450. The policy management component 450 can contain a set of rules regarding circulation of the notification instrument pushed by the information distributor. Sets of rules contained within the policy management component 350 may contain confidentiality settings and privacy settings. The set of rules could contain, for example, a list of acceptable and/or unacceptable networks or destination locations for the notification instruments, a limitation on forwarding of the notification instrument, and a rules for use of the notification instrument. The sets of rules contained within the policy management component 450 may be set by the information client or the information distributor and may be mutually agreed upon and set by these entities. In some instances, regulatory government entities may require a security level that is implement in the policy management component 450.

The tracing engine 400 may further include a tracer remote interface 430. The tracer remote interface 430 may include a tracer tracking mechanism 432 and a tracer command module 434. The tracer tracking mechanism 432 may detect when a recipient opens a notification instrument that includes a tracer as described above and may record data such as the time of access and the IP address of the accessing browser. The tracing engine 400 may additionally store tracer histories 440 as tracked by the tracer tracking mechanism 430.

In embodiments of the invention, the tracer tracking mechanism 432 may be capable of determining whether the tracer is within a specified network or whether its use by a recipient complies with predetermined parameters. The tracer command module 434 may determine, based on rules contained within the policy management component 450, whether the tracer location and disposition are acceptable. For example, the tracer may determine whether a user is creating an unauthorized file type of whether a user sends the instrument containing the tracer outside of the authorized network. If activities are deemed unauthorized, the tracer command module 434 may cause the notification instrument to encrypt or the tracer command module 434 may disseminate a command to destroy the notification instrument. In other embodiments of the invention, the tracer may contain its own command to self-encrypt or self-destruct.

Furthermore, based on the rules set in the policy management component 450, the tracer command module 434 may be capable of activating and deactivating the tracer. The tracer command module 434 can query for the tracer and require a response from the tracer. In this instance, the tracer may remain dormant until the query is issued. For instance, if the policy management component 450 includes a policy that requires determination of a network environment a set number of hours after the tracer's deployment, the tracer tracking mechanism 432 will wait for the appointed hour query the tracer to assess the environment and collect the information. Alternatively, the tracer itself may have the functionality to report back to the central server at the predetermined time.

Preferably, the tracer is designed to operate within systems that will resist its tracking functions. Thus, the tracer must have a model of its operating environment including the mechanisms it will have to protect against. Cryptography may be implemented in the tracer to render the tracer unreadable by others and conceal local information. Furthermore, the tracer or the tracer tracking mechanism should be designed to detect that the tracer has been discovered by a host system so that the tracer can adapt its behavior and preserve its working capability.

Thus, the generated tracer should be tamper resistant. In this regard, the tracer should be designed to minimize the possibility of recognition by the host computing environment in order to protect the system from tampering. The tracer computer code may include polymorphic code that has the capability to mutate while keeping the original algorithm intact. This technique is sometimes used by computer viruses, shellcodes and computer worms to hide their presence.

Another technique to shield the tracer is to design the tracer to use its discretion in carrying out policies. For example, the tracer may use the host's resources only when the usage will be undetected. The use of subliminal channels for communication may prevent detection. Furthermore, the tracer may be designed to ride on existing files, TCP connections, and posts when applicable. The tracer should further have multiple levels of security measures such that if one measure is defeated, others will be operable.

Communication between the server and the embedded tracer may occur as described in U.S. Pat. No. 7,246,324, which is hereby incorporated by reference and is related to a method and system for data capture with hidden applets. The method disclosed in this patent involves sending hypertext mark-up language from a server to the client, wherein the hypertext markup language includes codes for visible and invisible frames.

In addition to the policies provided by the policy management component 450, the information client may independently implement additional policies. While such policies may be incorporated within the policy management component 450, the policies may alternatively be contained within an information client server and may restrict information recipients from pulling information based on internal rules. Furthermore, the tracer functionality described above may also be implemented in a client side server.

Figure 5:
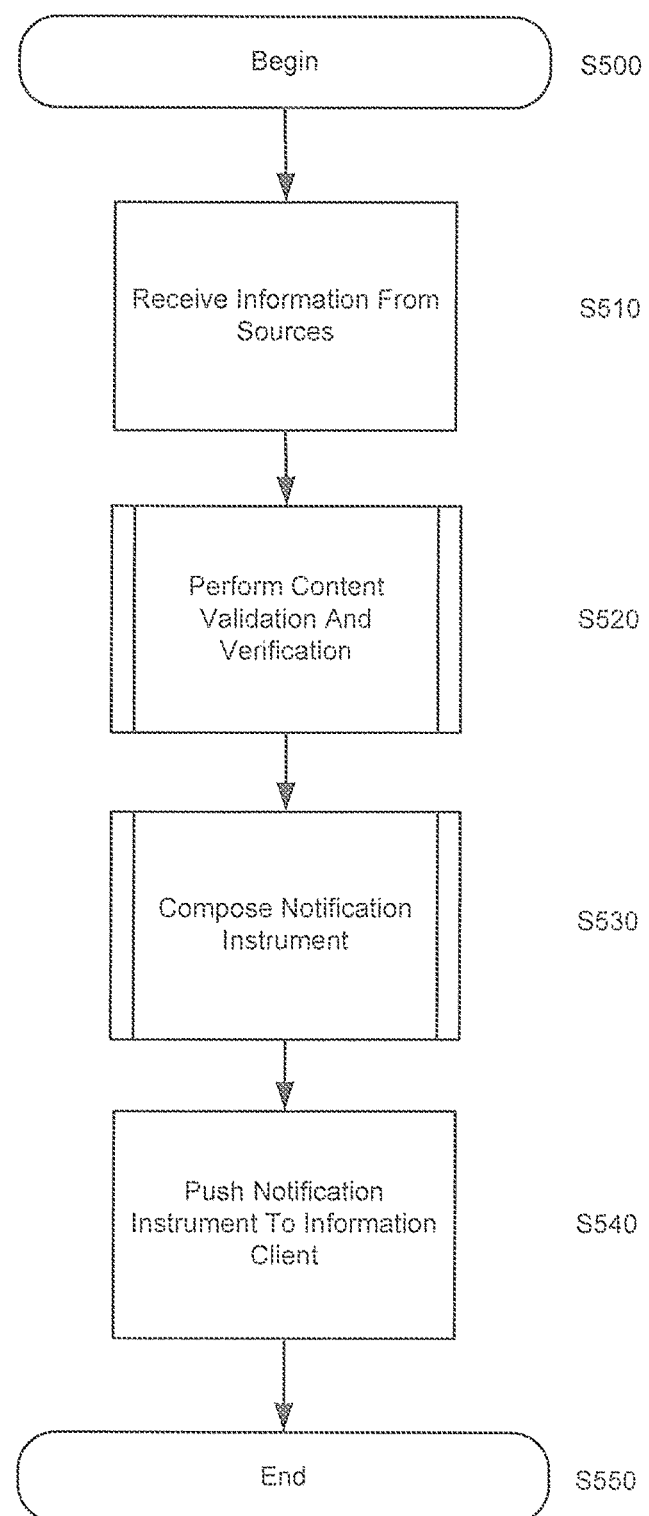
FIG. 5 is flow chart illustrating a basic overview of an information distribution method in a push and pull banking system in accordance with an embodiment of the invention.

FIG. 5 is flow chart illustrating a basic overview of an information distribution method in a push and pull banking system in accordance with an embodiment of the invention. The process begins in S501 and the information distributor 100 receives information from information sources in S510. In S520, the information distributor 100 through the server 200 performs content validation and verification. In S530, the information distributor 100 composes a notification instrument, which may include an electronic mail message that contains both a notification component and a payload component. In S540, the information distributor 100 pushes the notification instrument to the information client 120, 130. The push may include a handshake that dynamically sets communications channel parameters between the information distribution server and the information client to allow decryption. The process ends in S550.

Figure 6:
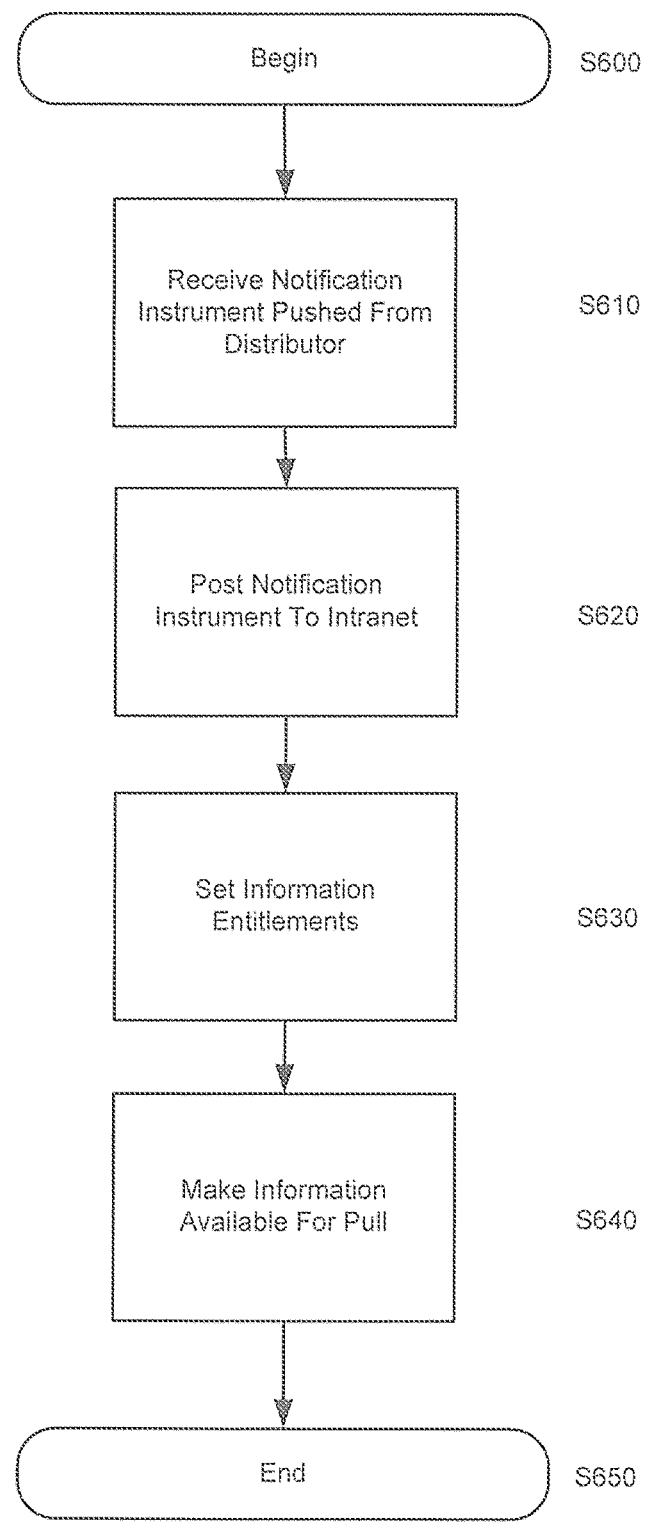
FIG. 6 is flow chart illustrating a method for receiving distributed information at an information client server in a push and pull banking system in accordance with an embodiment of the invention.

FIG. 6 is flow chart illustrating a method for receiving distributed information at an information client in a push and pull banking system in accordance with an embodiment of the invention. The method begins in S600. In S610, the information client receives the notification instrument pushed from the information distributor. In 620, the information client may select a location for storing the notification instrument in order to make the information available to the ultimate information recipients. In S630, the information client sets entitlements so that information is available only to authorized information recipients. In embodiments of the invention it is also possible that the information distributor server may set these entitlements. However, the information client is generally in possession of the most accurate and current information necessary for setting entitlements for information recipients and thus will generally perform this step. In S640, the information client makes the stored information available to be pulled by the authorized information recipients. The availability may preferably be through the information recipient's intranet site, but other possibilities exist. The method ends in S650.

Figure 7:
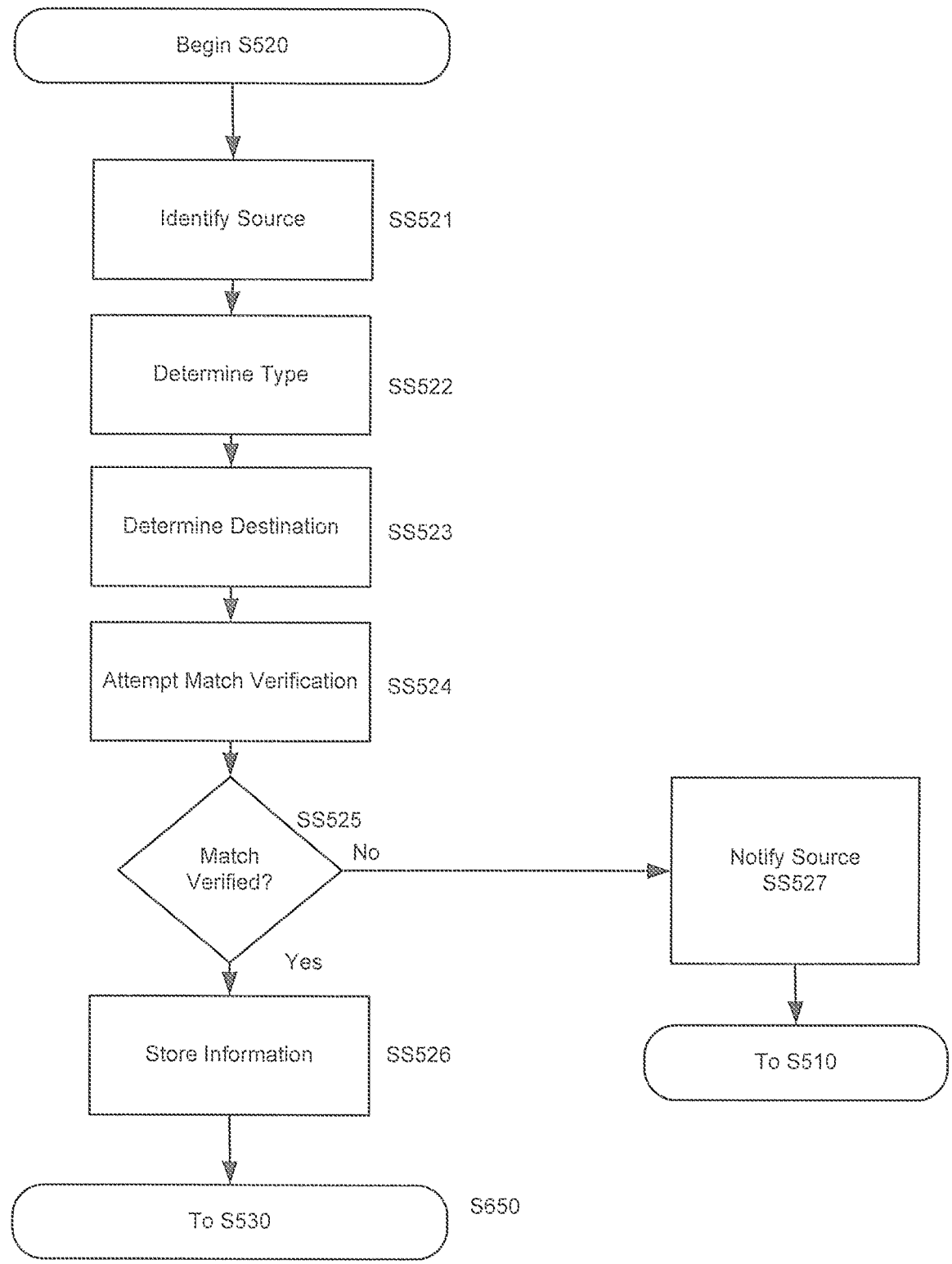
FIG. 7 is flow chart illustrating a verification and validation method in the push and pull banking system in accordance with an embodiment of the invention.

FIG. 7 is flow chart illustrating a verification and validation process (shown as step 520 in FIG. 5) in the push and pull banking system in accordance with an embodiment of the invention. Upon initiation of the method of S520, the information distributor identifies an information source in SS521. In SS522, the information distributor determines a type for the received information. In SS523, the information distributor may determine a destination for the received information. In SS524, the information distributor may attempt to match the determined source, type, and destination to verify the information. If the match is verified in SS525, the information distributor stores the information in SS526 and the information distributor proceeds to the step of S530 to compose a notification instrument as shown in FIG. 5. If the match is not verified in SS525, the information distributor may notify the information source of the problem in SS527 and the information distributor may return to receiving information as in S510.

Figure 8:
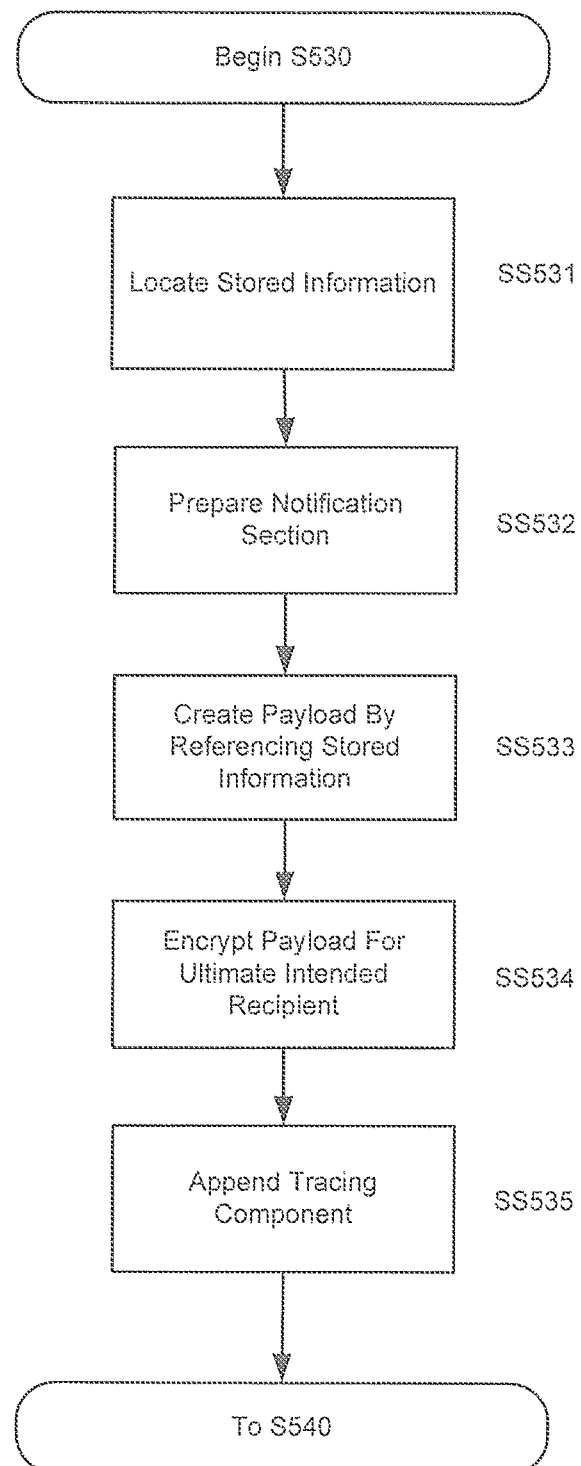
FIG. 8 is flow chart illustrating a method for preparing a notification instrument in the push and pull banking system in accordance with an embodiment of the invention.

FIG. 8 is flow chart illustrating a method for preparing a notification instrument in the push and pull banking system in accordance with an embodiment of the invention. The preparation of the notification instrument was shown as S530 in FIG. 5. The method begins and the information distributor locates the relevant stored information for transmission to an information client in SS531. The information distributor prepares the notification section of the notification instrument in SS532. In SS533, the information distributor creates a payload by referencing the located stored information. In SS534, the information distributor encrypts the payload for the ultimate intended recipient. In SS535, the information distributor appends a tracer and the method returns to S540 of FIG. 5 to push the notification instrument to the information client.

Figure 9:
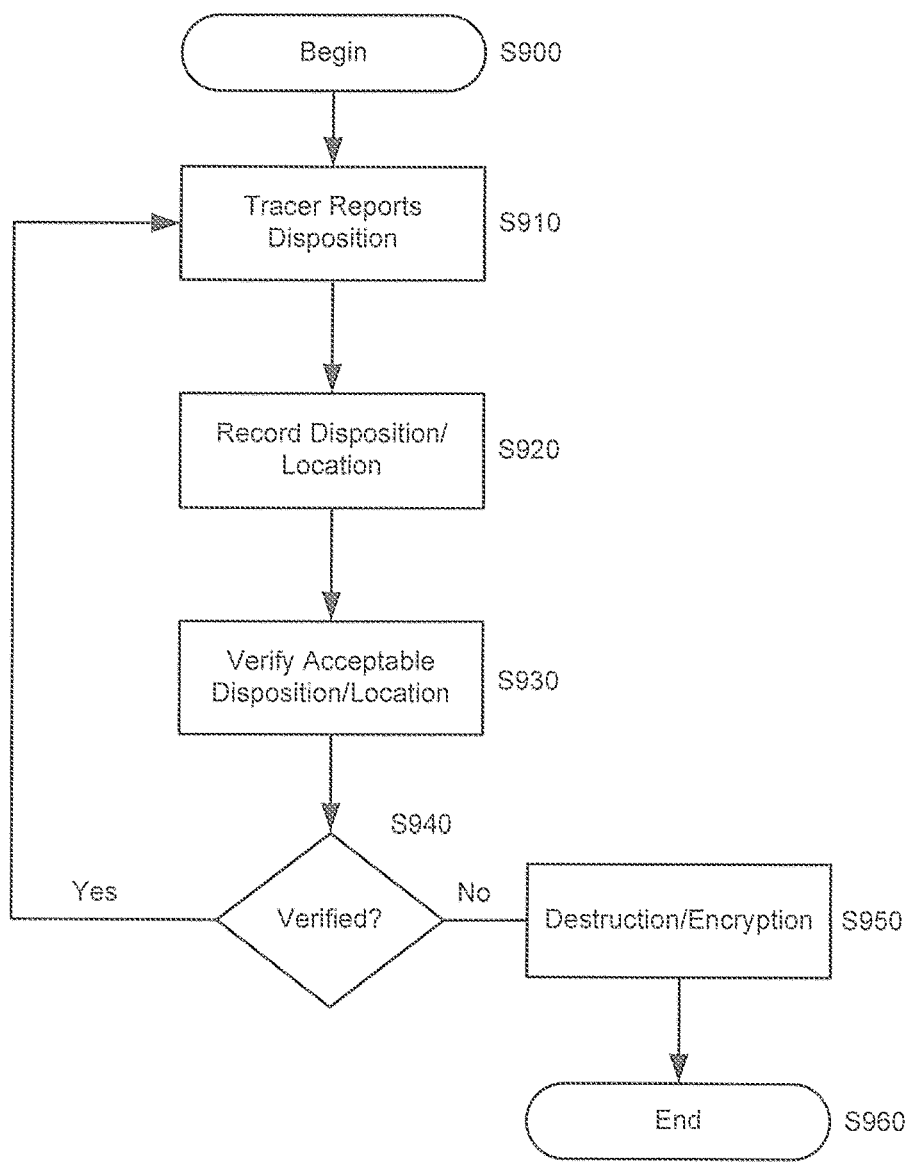
FIG. 9 is flow chart illustrating a tracing method in the push and pull banking system in accordance with an embodiment of the invention.

FIG. 9 is flow chart illustrating a tracing method in the push and pull banking system in accordance with an embodiment of the invention. The method begins in S900 and the appended tracer reports its disposition in S910. In S920, the information distributor records the transmitted disposition. In S930, the system verifies whether the disposition is acceptable. If an acceptable disposition is verified in S940, the system returns to receiving reports of tracer dispositions in S910. If the system fails to verify an acceptable disposition in S940, encryption of destruction of the traced information may occur in S950. The method ends in S960.

Figure 10:
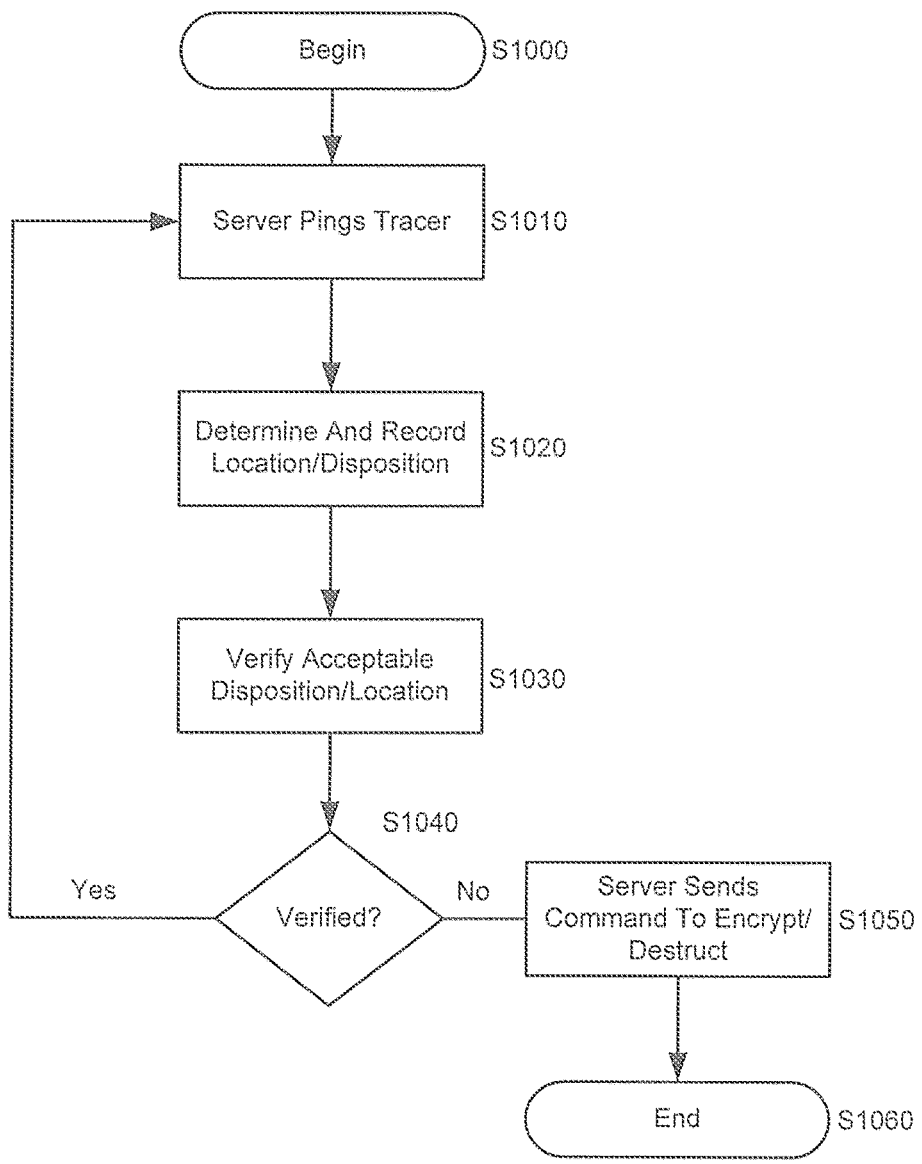
FIG. 10 is flow chart illustrating an additional tracing method in the push and pull banking system in accordance with an embodiment of the invention.

FIG. 10 is flow chart illustrating an additional tracing method in the push and pull banking system in accordance with an embodiment of the invention. The method begins in S1000 and the information distributor server pings for the tracer in S1010. In S1020, the information distributor server determines and records the location and disposition of the tracer. In S1030, the information distributor verifies whether the determined disposition of the tracer is an acceptable disposition. If the disposition is verified as acceptable in S1040, the information distributor server continues to ping for the tracer in S1010. If the disposition is not verified to be acceptable, the information distributor server may send a command to the tracer in S1050 to cause the traced information to encrypt or destruct. The method ends in S1060.

The relationship between the tracer and the server may take one of a variety of forms. In embodiments of the invention, the tracer is essentially a link back to functionality stored on the server and has no built-in features. In other embodiments, the tracer is able to self-report and execute commands independently of the server. In the latter case, the tracer may monitor its own location and usage and may self-destruct or self-encrypt when necessary. In some embodiments implementing a tracer, the information distributor server may create a unique URL for each tracer and with tracing mechanism in place, the information distributor server may determine the IP address of any computer accessing the URL. Access to the URL would occur automatically when access to the protected data is requested. The information distributor server is thereby capable of determining where the notification instrument is located and in certain circumstances whether the notification instrument is within an acceptable network. If the notification instrument is outside of the acceptable network, the notification instrument or information within the notification instrument may be destroyed or encrypted as described above.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A computer-implemented method for distributing and tracking information utilizing a tracer, the method comprising:

storing in at least one non-transitory computer memory, data and instructions pertaining to an information recipient, at least one entitlement rule associated with the information recipient, and tracer disposition rules defining an acceptable tracer disposition;

accessing the at least one non-transitory computer memory by a computer processor to execute the instructions stored at the non-transitory computer memory, and to perform steps including:

composing an electronic notification instrument using an electronic notification component and a payload component, the payload component including a selectable link providing access to the information, wherein the information is stored at a storage location and is selected based on the at least one entitlement rule associated with the information recipient;

encrypting the payload component based on information recipient characteristics;

pre-setting a policy for an acceptable disposition of the tracer;

appending the tracer including computer code to the electronic notification component, the tracer enabling identification of a disposition of the electronic notification instrument when the electronic notification component is accessed, wherein the disposition comprises a location or a usage of the electronic notification instrument;

pushing the electronic notification instrument to the information recipient;

determining whether the information recipient is an authorized information recipient by determining whether the disposition is acceptable based on the pre-set policy; and allowing a pull by the information recipient from the storage location through the electronic notification instrument such that the payload component including the selectable link is activated when the information recipient is authorized, the authorized information recipient determined by the tracer disposition rules.

2. The method of claim 1, wherein the tracer is appended to the electronic notification component, unreadable by information recipient systems, and comprises polymorphic computer code.

3. The method of claim 1, wherein the tracer includes multiple security levels.

4. The method of claim 1, further comprising setting entitlements for multiple information recipients using an entitlement engine.

5. The method of claim 1, further comprising receiving a request for the information including an IP address of a requesting computer, and access time, and a browser type.

6. The method of claim 1, wherein the tracer is one of a web beacon, a tracking bug, a pixel tag, a web bug, or a clear GIF.

7. The method of claim 1, further comprising configuring the tracer to access an information distribution server upon viewing of the electronic notification instrument.

8. The method of claim 7, further comprising recording an identity of a recipient viewing the electronic notification instrument.

9. The method of claim 8, further comprising pre-setting a policy for an acceptable tracer disposition, determining the disposition of the notification instrument, and determining whether the disposition is acceptable based on the pre-set policy and limiting access to the electronic notification instrument if the disposition is unacceptable.

10. The method of claim 1, further comprising receiving information from at least one information source and validating and verifying the information prior to preparing the electronic notification instrument.

11. A computer-implemented information distribution system for distributing information from an information distributor using a tracer, the information distribution system comprising:
    at least one non-transitory storage device storing data and instructions pertaining to an information recipient, at least one entitlement rule associated with the information recipient, and tracer disposition rules defining acceptable tracer disposition; and
    at least one computer processor accessing the data and instruction stored at said non-transitory storage device, the executing instructions to perform steps including:
        composing an electronic notification instrument using an electronic notification component and a payload component, the payload component including a selectable link providing access to information, wherein the information is stored at a storage location and is selected based on the at least one entitlement rule associated with the information recipient;
        encrypting the payload component based on information recipient characteristics;
        pre-setting a policy for an acceptable disposition of the tracer;
        appending the tracer including computer code to the electronic notification component, the tracer enabling identification of a disposition of the electronic notification instrument when the electronic notification component is accessed, wherein the disposition comprises a location or a usage of the electronic notification instrument;
        pushing the electronic notification instrument to the information recipient;
        determining whether the information recipient is an authorized information recipient by determining whether the disposition is acceptable based on the pre-set policy; and
        allowing a pull by the information recipient from the storage location through the electronic notification instrument such that the payload component including the selectable link is activated by an authorized information recipient, the authorized information recipient determined by the tracer disposition rules.

12. The system of claim 11, wherein the tracer is appended to the electronic notification component, unreadable by information recipient systems, and comprises polymorphic computer code.

13. The system of claim 11, wherein the tracer includes multiple security levels.

14. The system of claim 11, further comprising setting entitlements for multiple information recipients using an entitlement engine.

15. The system of claim 11, further comprising receiving a request for the information including an IP address of a requesting computer, and access time, and a browser type.

16. The system of claim 11, wherein the tracer is one of a web beacon, a tracking bug, a pixel tag, a web bug, or a clear GIF.

17. The system of claim 11, further comprising configuring the tracer to access an information distribution server upon viewing of the electronic notification instrument.

18. The system of claim 17, further comprising recording an identity of a recipient viewing the electronic notification instrument.

19. The system of claim 11, further comprising pre-setting a policy for an acceptable tracer disposition, determining the disposition of the notification instrument, and determining whether the disposition is acceptable based on the pre-set policy and limiting access to the electronic notification instrument if the disposition is unacceptable.

20. The system of claim 11, further comprising receiving information from at least one information source and validating and verifying the information prior to preparing the electronic notification instrument.

* * * * *